United States Patent [19]

Goekler

[11] Patent Number: 5,253,756
[45] Date of Patent: Oct. 19, 1993

[54] CONTAINER FOR DATA-STORAGE DEVICES

[75] Inventor: Malcolm L. Goekler, Laredo, Tex.

[73] Assignee: Hunt Holdings, Inc., Wilmington, Del.

[21] Appl. No.: 959,609

[22] Filed: Oct. 13, 1992

[51] Int. Cl.$^5$ .................. B65D 85/30; B65D 1/36; B65D 6/04
[52] U.S. Cl. ............................ 206/444; 206/387; 206/558; 206/561; 220/505; 220/528; 220/533; 220/555; D9/456; D9/347; D9/341; D3/35
[58] Field of Search ............... 206/387, 444, 558, 561; 220/505, 528, 529, 532, 533, 555; D9/456, 347, 341; D3/35

[56] References Cited

U.S. PATENT DOCUMENTS

| | | |
|---|---|---|
| D. 239,664 | 4/1976 | Savoy . |
| D. 249,743 | 9/1978 | Berkman .................. D87/1 D |
| D. 249,823 | 10/1978 | Berkman .................. D87/1 D |
| D. 287,666 | 1/1987 | Long et al. ................ D3/35 |
| 638,785 | 12/1899 | Whittlesey . |
| 4,117,931 | 10/1978 | Berkman .................. 206/387 |
| 4,231,473 | 11/1980 | Aprahamian .............. 206/387 |
| 4,285,558 | 8/1981 | Medford .................. D3/35 X |
| 4,366,903 | 1/1983 | Gaiser et al. ............. 206/387 |
| 4,512,468 | 4/1985 | Stravitz .................... 206/387 |
| 4,518,084 | 5/1985 | Berkman .................. 206/387 |
| 4,705,169 | 11/1987 | Mastronardo ............ 206/387 |
| 4,715,669 | 12/1987 | Baillie et al. .............. 312/12 |
| 4,782,949 | 11/1988 | Berkman .................. 206/387 |
| 4,807,760 | 2/1989 | Sussman ................ 206/561 X |
| 4,819,798 | 4/1989 | Hasuike .................... 206/444 |
| 4,889,244 | 12/1989 | Hehn et al. ................ 211/41 |
| 4,951,814 | 8/1990 | Belmont ................... 206/387 |
| 4,960,205 | 10/1990 | Wang ....................... 206/387 |
| 5,069,358 | 12/1991 | Avery ...................... 220/426 |

Primary Examiner—William I. Price
Attorney, Agent, or Firm—Synnestvedt & Lechner

[57] ABSTRACT

A container for holding data-storage devices of different sizes, e.g. disks of various sizes, cartridges and cassettes. The container is provided with a plurality of trays, preferably identical to each other, which rest on the container bottom, each tray having a platform for receiving and holding data-storage devices Each tray can be turned either side up in the container, and each has support members which are of different heights on its opposite sides so that the platform is positioned higher or lower in the container depending on which way it is turned. The trays are placed in the container in an orientation selected to support the particular size of storage devices to be placed in them; for taller storage devices, the tray is preferably turned so its platform is lower, and vice versa when shorter storage devices are to be stored, whereby the tops of storage devices of different sizes can be made to lie at about the same height for convenient viewing and grasping. Compartments are formed on each side of each tray, and these compartments are preferably of smaller area on the side of the tray which is uppermost when the tray is in the position which places the platform in its higher position, i.e. to receive shorter devices. The bottom of the container is preferably ridged, so it can be used to receive and hold especially large data-storage devices when the trays are removed.

10 Claims, 5 Drawing Sheets

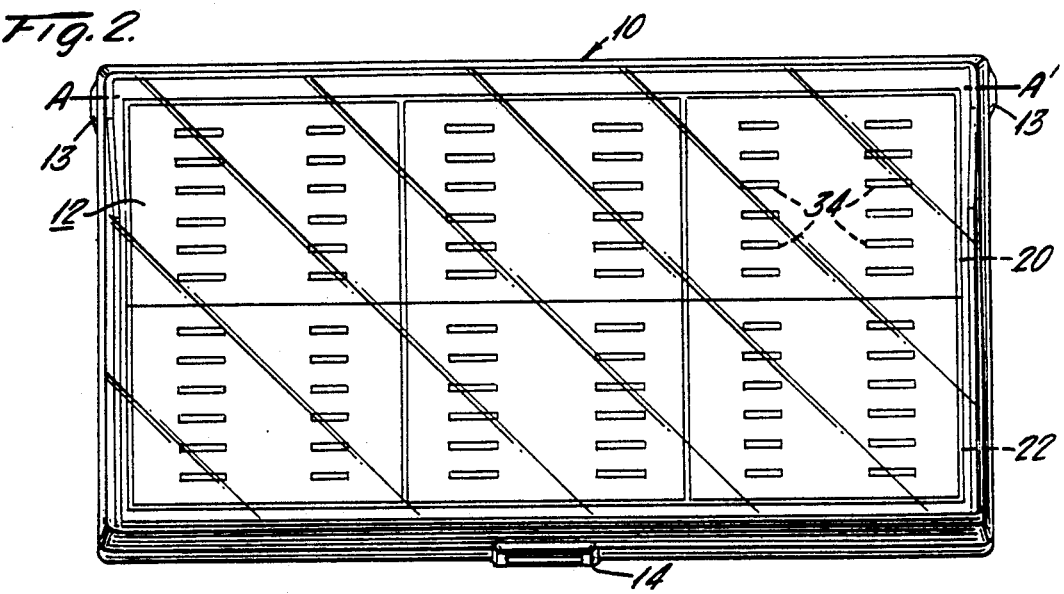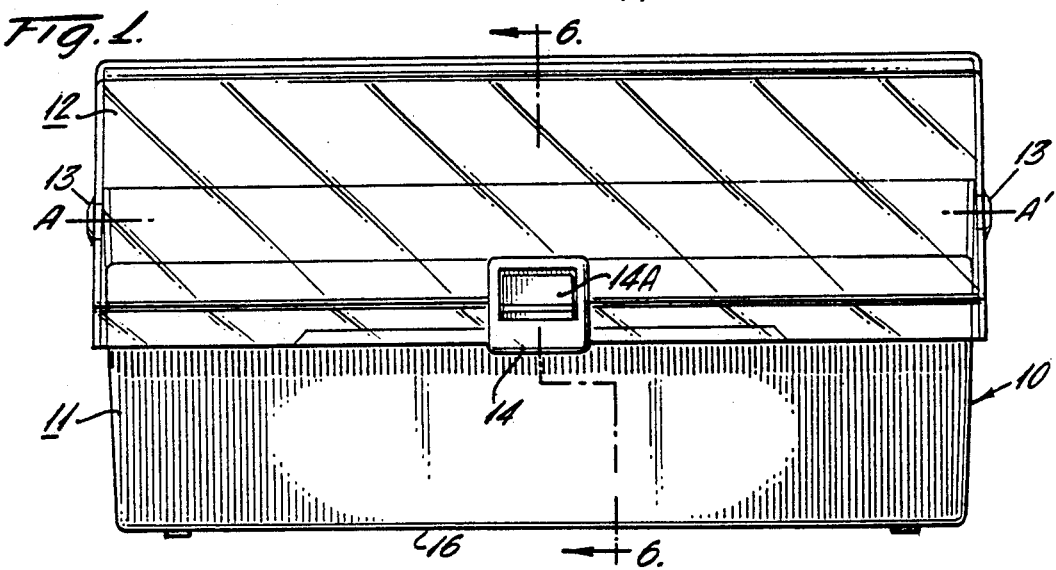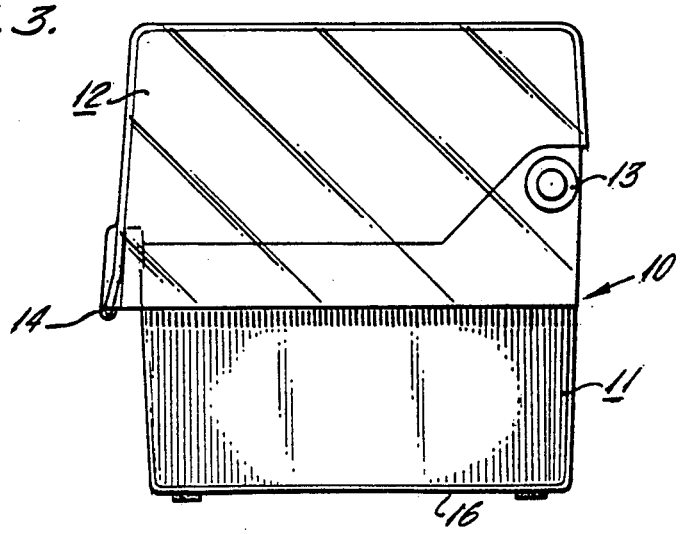

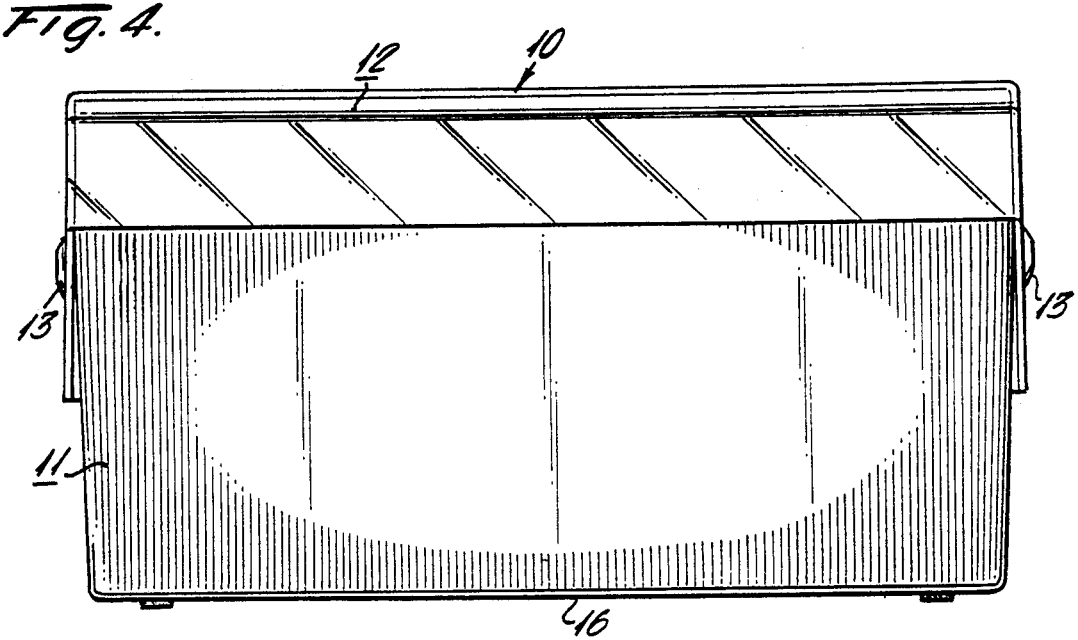
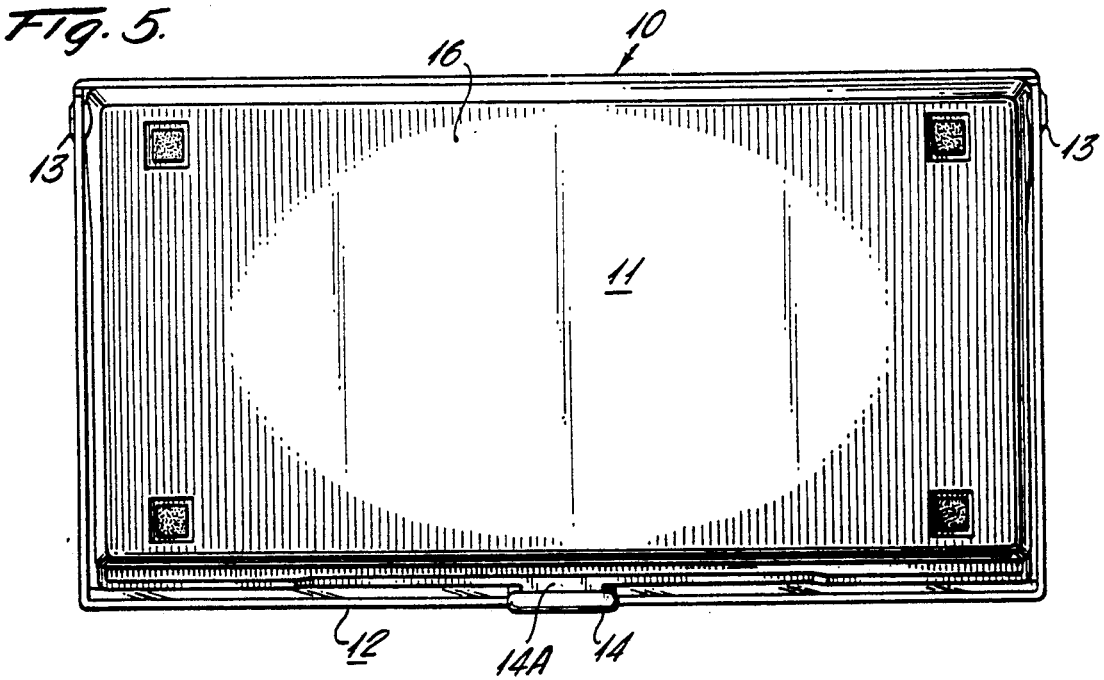

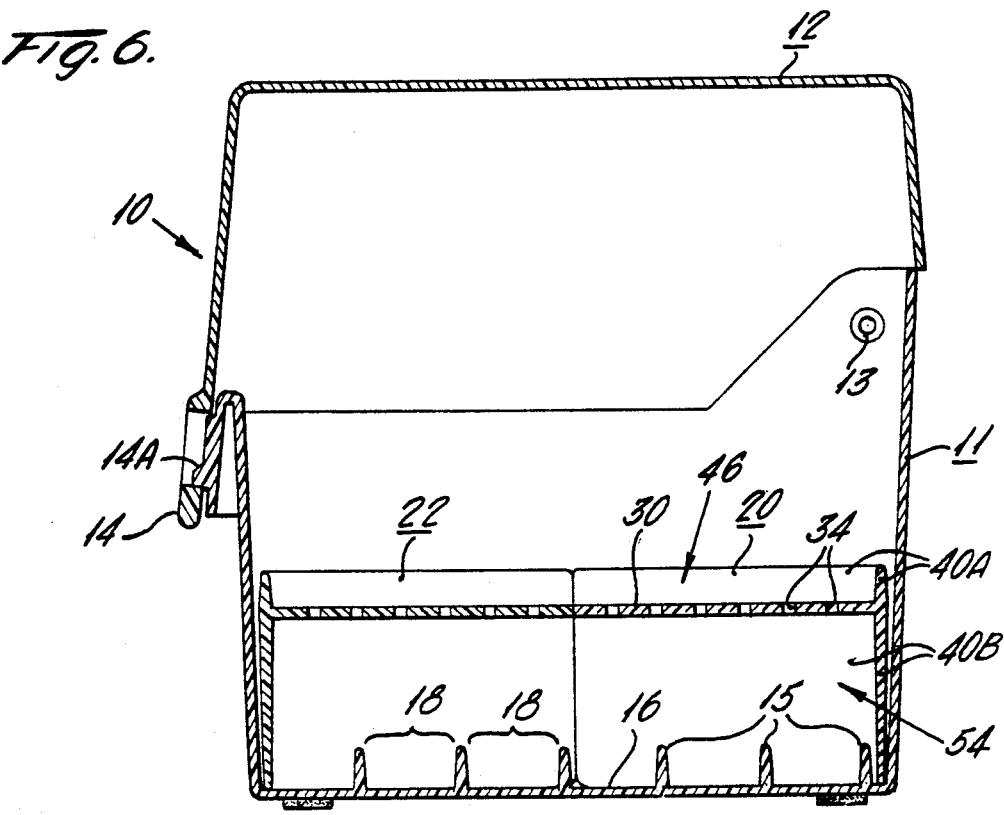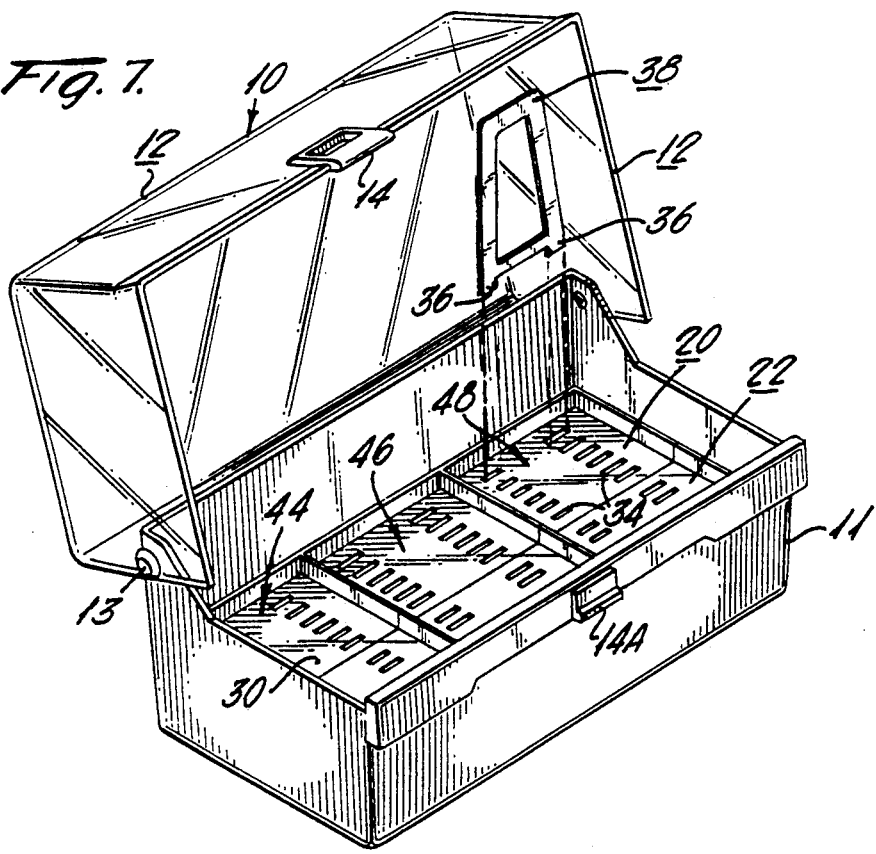

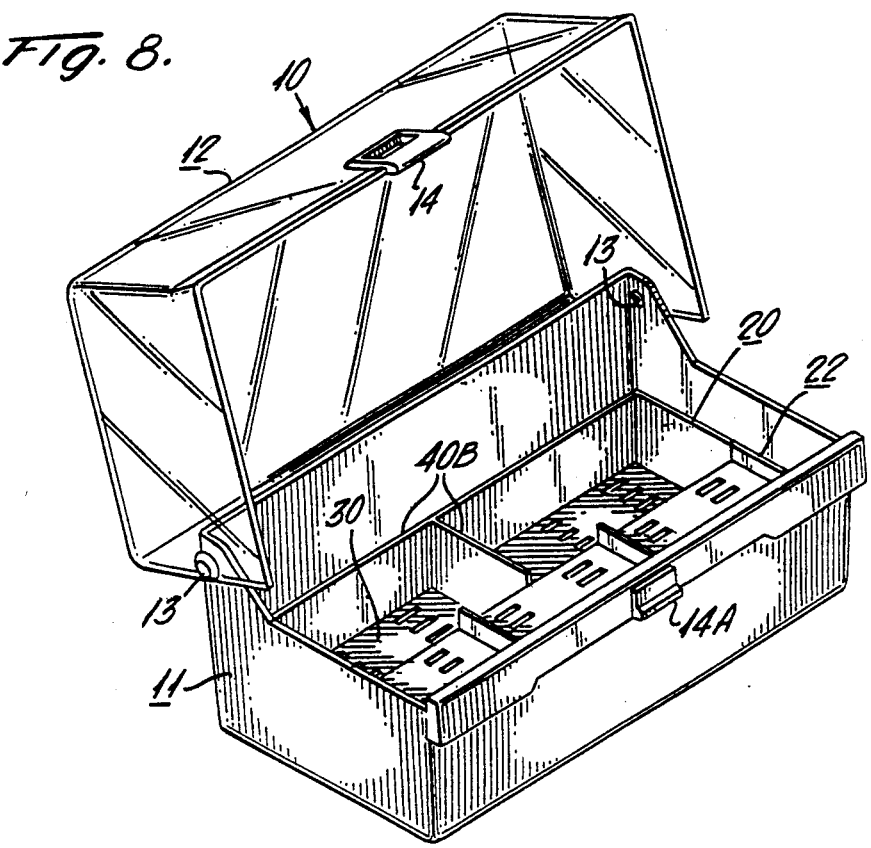
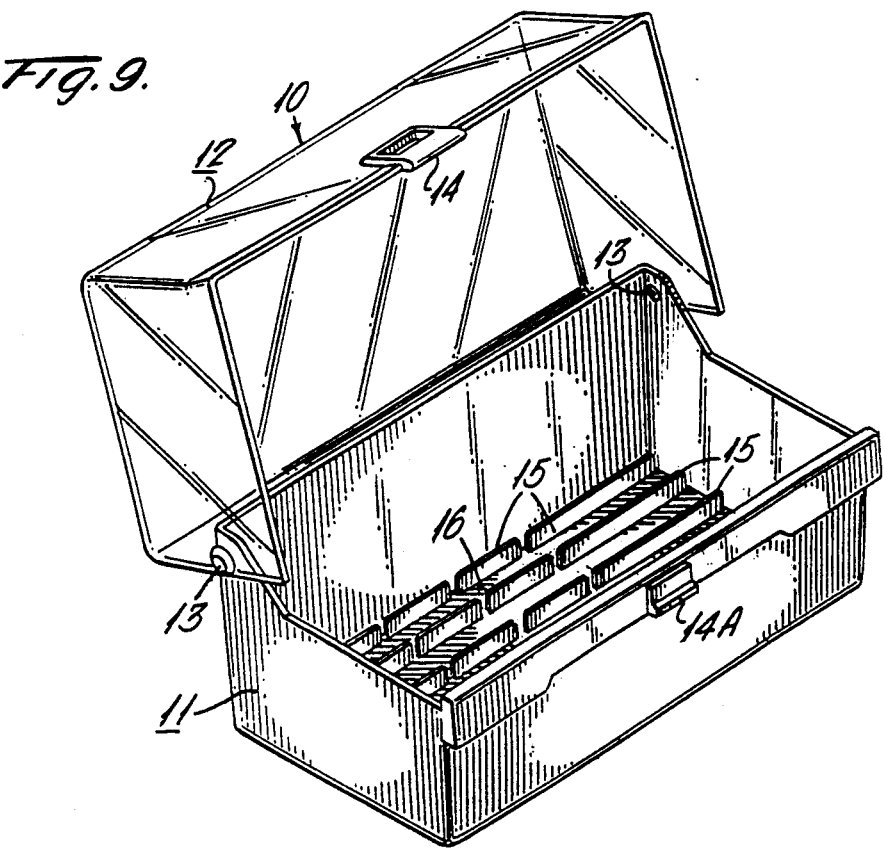

CONTAINER FOR DATA-STORAGE DEVICES

FIELD OF THE INVENTION

This invention relates to containers for holding data-storage devices, for example floppy disks, compact disks, cartridges and cassettes, each capable of carrying information recorded thereon in electrical, magnetic, or optical form, for example. It relates especially to containers designed to hold a variety of such data-storage devices of different sizes. For the purpose of this application "data" is used to describe any type of recorded information, whether digital or analog, whether cultural or commercial in nature.

BACKGROUND OF THE INVENTION

Containers are known for holding data-storage devices of the same or different sizes. Such devices include, for example 3½" and 5¼" disks, compact disks, cassettes and mini-cassettes. Commonly, such a container comprises a box with an openable lid, and the data-storage devices are stacked on end, on the bottom of the box. However, these containers are often designed to hold only one particular kind, or one particular mixture of kinds, of data-storage devices, and hence are not versatile enough to serve efficiently a variety of different users, or the same user whose needs change from time to time. They also commonly hold and present the data-storage devices in a way which makes it difficult to identify, grasp and remove them.

One known form of container uses a two-dimensional array of slots extend through its bottom, whereby tabs on the bottom of dividers can be inserted into the slots to form compartmentalized areas of different lateral dimensions suitable for holding data storage devices of different sizes; in another known form of container the width of the container is great enough to accommodate easily 5¼" disks or compact disks, and slots are provided to permit plugging in of dividers which divide the container in half laterally, so as to accommodate 3½" disks. In both of these latter types of containers, the tops of different sizes of data storage devices are at different heights, so that some of them typically are difficult to see and grasp.

It is therefore an object of this invention to provide a highly versatile container for data-storage devices, which is efficient and effective to use.

It is also an object of this invention to provide such a container in which the tops of the data storage devices it carries are substantially at the same height so they can be seen and grasped easily, even if the smaller devices are at the rear of the container.

SUMMARY OF THE INVENTION

In accordance with the invention, a container is provided for holding a plurality of data-storage devices which comprises an outer box, and a plurality of trays insertable into and removable from the box, each carrying a platform for holding the data-storage devices. Each tray has first relatively-shorter support members extending normally from its platform in one direction for supporting the tray in a first position on the bottom of the box, and second relatively-longer support members extending normally from the platform in the opposite direction for supporting the tray on the bottom of the box in a second position when the tray is turned over. This difference in length of the support members causes the platform to be lower when in its first position and higher when in its second position. In addition, each platform has walls extending normally thereto to define laterally-divided compartments for holding different sizes of data-storage devices.

Preferably the trays are substantially identical, and the compartments are of greater number and smaller area on the side of the platform from which the relatively shorter members extend, than on the opposite sides of the platform. The trays preferably cover substantially the entire bottom of the box when placed in it, and the presently-preferred number of trays is two, although more may be used. Also in the preferred embodiment, each platform is preferably provided with rows and columns of slots into which upstanding dividers can be plugged to separate different categories of data-storage devices and to aid in holding them erect when there are not enough devices in a compartment to pack them tightly in position. The support members for each tray are preferably provided by the same walls which also define, at least in part, the tray compartments.

In use, the trays may be installed on the bottom of the box in any of a variety of combinations of the positions referred to above. With two trays, the possible combinations are: (1) both trays in the first position (platform low); (2) both trays in the second position (platform high); (3) a first tray in the first position, the other in the second position; and (4) the first tray in the second position and the other tray in the first position. Case (1) permits convenient storage of large devices only; case (2) permits convenient storage of only small devices; case (3) permits convenient storage of small devices nearer the front of the casing and larger devices nearer the rear of the casing; and case (4) permits convenient storage of larger devices near the front of the casing and smaller ones near the rear of the casing.

In addition, the bottom of the inside of the container is preferably provided with upstanding ridges or walls spaced apart sufficiently to accommodate and store video cartridges, when both trays are removed.

With this arrangement, a high degree of versatility with respect to storage of different sizes of data storage devices is provided, using a relatively simple container system. By placing the larger devices on a platform which is in its lower position, the required height of the box is minimized, and at the same time, by placing smaller devices on a platform in its higher position, the labels at the tops of the smaller devices are more readily visible and their top ends more easily grasped.

BRIEF DESCRIPTION OF FIGURES

These and other objects and features of the invention will be more readily understood from a consideration of the following detailed description, taken with the accompanying drawings, in which:

FIG. 1 is a front elevational view of a multi-media storage file in accordance with the invention;

FIG. 2 is a plan view of the multi-media storage file shown in FIG. 1;

FIG. 3 is a side elevational view of the multi-media storage file as viewed from the right hand side of FIG. 1; both sides are identical;

FIG. 4 is a rear elevational view of the multi-media storage file;

FIG. 5 is a bottom plan view of the multi-media storage file;

FIG. 6 is an enlarged stepped sectional view taken on the line 6—6 of FIG. 1 to more clearly define certain features of the design;

FIG. 7 is an isometric view of the multi-media storage file of this invention, shown with the lid in an opened condition and with one of its dividers in an exploded position;

FIG. 8 is an isometric view similar to FIG. 7 but showing the removable tray inserts in a different design configuration;

FIG. 9 is an isometric view similar to FIGS. 7 and 8 but showing both tray inserts removed and showing design details of the file's inner bottom panel.

DESCRIPTION OF SPECIFIC EMBODIMENTS

Figure 10:
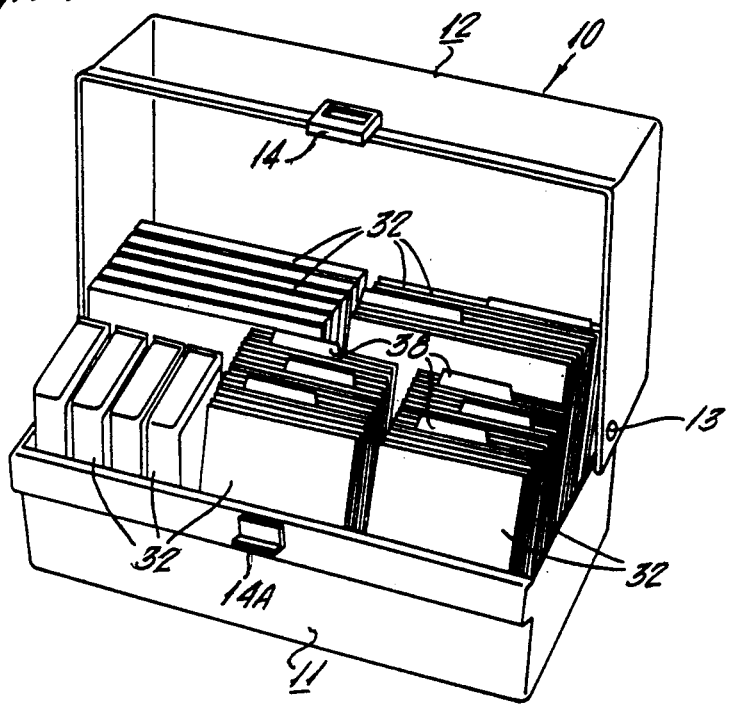
FIG. 10 is a perspective view of the file of the invention with the platforms and multi-media information storage devices mounted within it, as it is used in one application thereof.

Referring now to the preferred embodiments of the invention shown in the drawings by way of example only, the container of the invention comprises in this example a flat-bottomed box 10, which may be of a clear plastic material and composed of a main compartment 11 and a cover 12 pivotable about an axes A—A' by means of pins such as 13 so that the top of the box can be opened to insert or remove data-storage devices and closed to protect them from contamination, as by dust or spillage. A resilient catch 14 is provided on the center of the front of the cover, and mates with a keeper 14A (FIG. 7) on the middle of the top portion of the front of the main compartment to provide a simple and easily-releasable locking system.

Also in this example, parallel ridges 15 (FIGS. 6 and 9) are formed on the top side of the bottom 16 of the container (FIG. 6), providing channels such as 18 between them in which relatively large data-storage devices such as video cartridges can be kept when the box is otherwise empty.

Provided along with the box are two plastic trays 20 and 22 (FIGS. 7, 8 and 11), which are in this example identical with each other. As shown, when placed on the bottom of box 10 they lie side-by-side and completely cover the bottom of the box. Since the trays are identical, only tray 20 need be described here in detail.

Tray 20 is of integrally molded plastic, and comprises a horizontal platform 30; the data-storage devices such as 32 are stored on top of whichever side of platform 30 is uppermost in the selected orientation of the tray. Rows and columns of slots such as 34 extend through platform 30, into which lugs 36 at the bottom of dividers such as 38 may be inserted to mount them in an erect position, wherever desired on the platform (FIG. 7).

Walls such as 40A and 40B extend normally from platform 30 in both directions. These serve a dual purpose in this embodiment of defining horizontal storage components such as 44, 46, 48 on one side of the tray and 50, 54 on the other side, and of supporting the platform on the bottom of the container. Preferably, all of the walls on a given side of each tray are of the same height, but they are shorter on one side than on the other. More particularly, the walls 40A on the side of the tray having the three relatively smaller compartments 44, 46, 48 are shorter than the walls 40B on the opposite side of the tray which contains the two relatively larger compartments. As a result, when the tray is placed in the box in a first position (FIG. 11C) with its two compartments facing upwardly, it rests in its shorter supporting walls, and its platform is thereby at a lower level than when the tray is turned upside down so its longer supporting walls extend downwardly.

Figure 11A:
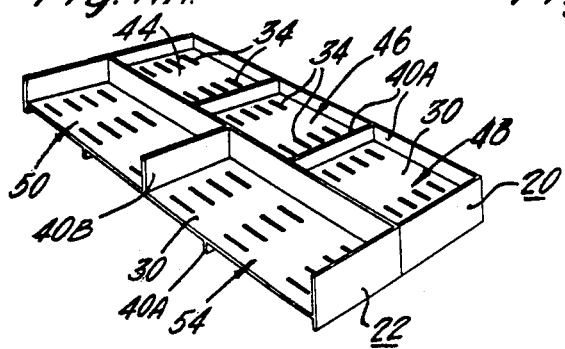
FIGS. 11A, 11B, 11C and 11D show four different arrangements or patterns in which two identical trays can be placed in the file.

Four usefully different combination of positions in which the two trays can be installed in box 10 are shown in FIGS. 11A, B, C and D. In FIG. 11A, the first tray 22 is placed with its platform in its lower position, the better to accommodate larger data-storage devices such as 5¼" disks and cassettes; the rear tray 20 is reversed from this, so that its platform is higher, and suitable for storage of smaller data-storage devices such as of 3½" disks.

Figure 11B:
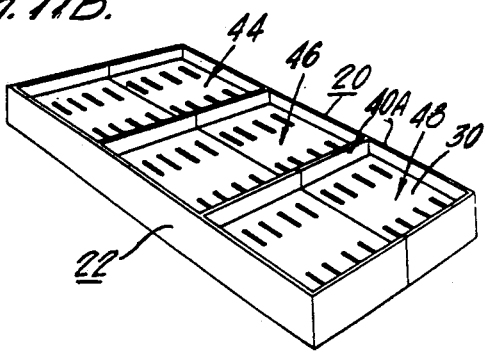

In FIG. 11B, both trays are turned to present their platforms in their higher position, as is useful when only 3½" disks, for example, are to be stored.

Figure 11C:
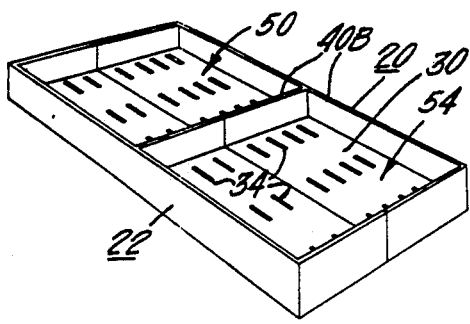

In FIG. 11C, both trays are inserted with their platforms in their lower positions (shorter walls downward), as is suitable for storing only 5¼" disks.

Figure 11D:
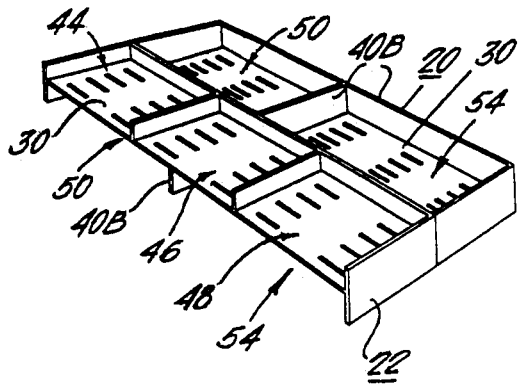

In FIG. 11D, the front tray is turned so its platform is in the high position and its rear platform is in its lower position, as is useful for storing larger storage devices at the rear of the box and smaller ones in the front.

Accordingly there has been provided a container for data storage devices which is highly versatile, convenient, and easy to use, while being of simple, inexpensive construction.

While the invention has been described with particular reference to specific embodiments in the interest of complete definiteness, it will be understood that it may be embodied in a variety of forms diverse from those specifically shown and described, without departing from the spirit and scope of the invention.

What is claimed is:

1. A container for holding a plurality of different sizes of data storage devices such as cartridges, cassettes and/or disks each capable of bearing electrically, magnetically or optically recorded information, comprising:
   an outer box having sidewalls and a bottom;
   a plurality of trays each having a platform for receiving and holding said data storage devices, and each insertable into and removable from said box;
   at least one of said trays having first support members extending in one direction normal to said platform thereof, and having second support members extending in the opposite direction normal to said platform, whereby said at least one of said trays, in a first position thereof, can rest on the bottom of said box supported by said first support members, or supported by said second members when said tray is turned over to a second position thereof;
   the height of the upper side of said platform above said bottom of said box being less when said tray is in said first position than when it is in said second position;
   said at least one tray having walls extending normally to said platform and defining a plurality of open-topped compartments for holding said data storage devices.

2. The container of claim 1, wherein each of those compartments on the side of said platform which is uppermost when said tray is in said first position being of smaller horizontal area than those compartments on the opposite side of said platform.

3. The container of claim 2, wherein there are a larger number of said compartments of smaller horizontal area than there are of those on the opposite side of said platform.

4. The container of claim 1, wherein at least some of said walls of said at least one tray comprise said first and second support members.

5. The container of claim 1, wherein said at least one tray is substantially identical with another of said trays.

6. The container of claim 5, wherein said plurality of trays consists of two trays which when both placed in said box substantially cover the bottom thereof.

7. The container of claim I, wherein said platform of said at least one tray is provided with a plurality of slots extending through it and adapted to receive and support a plurality of dividers.

8. The container of claim 4, comprising spaced-apart walls extending upward from the bottom of said box for receiving data-storage devices inserted between them.

9. A multi-media file for holding a plurality of different kinds of information-storage devices, comprising:

an outer box having a bottom, sidewalls, and an openable top cover;

a first and a second tray, each comprising a horizontal platform for receiving and holding said information-storage devices, each tray being insertable into and removable from positions in said box on the bottom thereof, said first and second trays being substantially identical;

each of said trays having walls extending normally to its platform and in both directions from said platform, to form a first set of supports on one side of said platform and another set of supports on the other side of said platform, by which to support said each tray on said bottom of said box, said first and second trays when placed next to each other on the bottom of said box substantially covering said bottom;

those of said walls extending from a first side of each of said platforms being shorter than those extending from the opposite side thereof, whereby when either of said trays rests on said box bottom with its shorter walls extending downwardly, said platform of the corresponding tray is higher than when said tray rests on said bottom of said box with its longer walls extending downwardly;

said walls defining a plurality of horizontally-extending compartments, those of said compartments on said first side of each of said platforms being larger in number but smaller in area than those on said opposite side of each said platform.

10. The multi-media file of claim 9, wherein each of said platforms is provided with slots extending through it suitable for supporting dividers.

* * * * *